(12) United States Patent
Gresset et al.

(10) Patent No.: US 10,009,155 B2
(45) Date of Patent: Jun. 26, 2018

(54) METHOD AND SYSTEM FOR DETERMINING TIME AND FREQUENCY RESOURCES

(71) Applicant: MITSUBISHI ELECTRIC CORPORATION, Tokyo (JP)

(72) Inventors: Nicolas Gresset, Rennes (FR); Loic Brunel, Rennes (FR); Hiroyasu Sano, Tokyo (JP); Kazumasa Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 95 days.

(21) Appl. No.: 15/039,011

(22) PCT Filed: Dec. 19, 2014

(86) PCT No.: PCT/JP2014/084730
§ 371 (c)(1),
(2) Date: May 24, 2016

(87) PCT Pub. No.: WO2015/105032
PCT Pub. Date: Jul. 16, 2015

(65) Prior Publication Data
US 2017/0026153 A1    Jan. 26, 2017

(30) Foreign Application Priority Data

Jan. 10, 2014 (EP) .................................... 14150820

(51) Int. Cl.
*H04W 72/08* (2009.01)
*H04L 5/00* (2006.01)

(52) U.S. Cl.
CPC .......... *H04L 5/0012* (2013.01); *H04L 5/0016* (2013.01); *H04L 5/0044* (2013.01);
(Continued)

(58) Field of Classification Search
CPC .. H04W 72/083; H04W 72/08; H04L 5/0012; H04L 5/0016; H04L 5/0044; H04L 5/0053
See application file for complete search history.

(56) References Cited

U.S. PATENT DOCUMENTS

| 9,635,705 B2 * | 4/2017 | Lu ........................ H04W 84/00 |
| 2002/0080739 A1 | 6/2002 | Kuwahara |

(Continued)

FOREIGN PATENT DOCUMENTS

| JP | 9-102979 A | 4/1997 |
| JP | 2001-358615 A | 12/2001 |

(Continued)

*Primary Examiner* — Wei Zhao
(74) *Attorney, Agent, or Firm* — Birch, Stewart, Kolasch & Birch, LLP

(57) ABSTRACT

For determining time and frequency resources, a first device performs: obtaining groups of time and frequency resources of the wireless communications network so as to form a redrawn grid; allocating time and frequency resources according to the redrawn grid and to a frequency hopping criteria; and providing signalling information representative of the time and frequency resources that have been allocated according to the redrawn grid. In order to determine which time and frequency resources of the initial grid to be used for performing said transmissions, a second device performs: obtaining the signalling information so as to determine the time and frequency resources that have been allocated according to the redrawn grid; and applying a predetermined pattern mask onto the determined time and frequency resources that have been allocated according to the redrawn grid.

15 Claims, 11 Drawing Sheets

Figure 1:
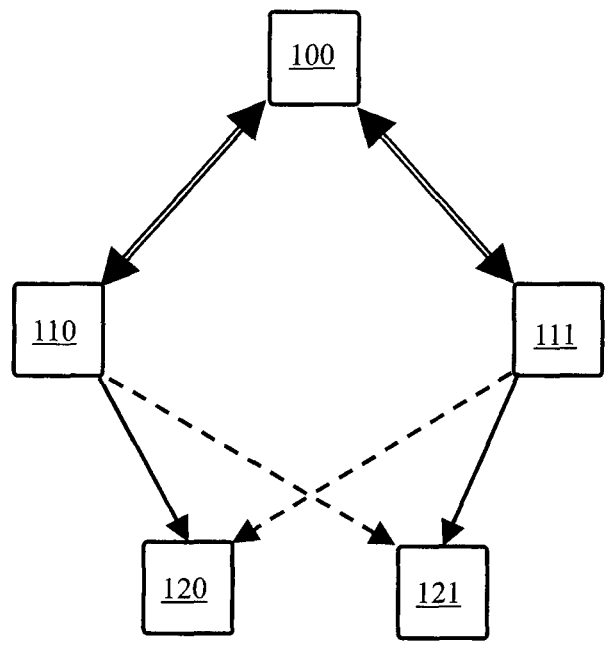

(52) U.S. Cl.
CPC .......... *H04L 5/0053* (2013.01); *H04L 5/0062* (2013.01); *H04W 72/082* (2013.01); *H04L 5/0091* (2013.01)

(56) References Cited

U.S. PATENT DOCUMENTS

| | | |
|---|---|---|
| 2003/0058923 A1 | 3/2003 | Chen et al. |
| 2007/0064770 A1 | 3/2007 | Horiguchi |
| 2011/0222489 A1 | 9/2011 | Awad |
| 2012/0213196 A1* | 8/2012 | Chung .................. H04B 1/713 370/330 |
| 2014/0010131 A1 | 1/2014 | Gaal et al. |
| 2016/0007335 A1* | 1/2016 | Chun .................... H04W 8/005 370/336 |

FOREIGN PATENT DOCUMENTS

| | | |
|---|---|---|
| JP | 202-198867 A | 7/2002 |
| JP | 2005-142860 A | 6/2005 |
| JP | 2006-115084 A | 4/2006 |
| JP | 2007-88856 A | 4/2007 |
| WO | WO 2007/014310 A2 | 2/2007 |

\* cited by examiner

METHOD AND SYSTEM FOR DETERMINING TIME AND FREQUENCY RESOURCES

The present invention generally relates to determining and signalling time and frequency resources to be used to perform transmissions within a wireless communications network.

In order to perform transmissions within a wireless communications network, resources of the wireless communications network need to be allocated by a device of the wireless communications network in charge of coordinating the resources usage. Allocations of resources need to be signalled within the wireless communications network so that each device of the wireless communications network become aware of which resources have effectively to be used to perform said transmissions.

Time and frequency resources are typically used to enable performing said transmissions. Time is divided into time slots of equal size, which thus defines time resources. Plural frequencies or frequency bands are available to perform transmissions, which thus defines frequency resources. Usage of one such frequency or frequency band during one such time slot defines one time and frequency resource. Time and frequency resources are typically represented using a grid, with frequency resources on one axis and time resources on another axis. When considering for instance a set of sixteen frequency bands over twenty time slots, signalling information typically consists of eighty bits, four bits to cover the sixteen frequency resources for each one of the twenty time resources. Such figures consider the case where one and only one frequency resource is allocated per time slot for said transmissions. More signalling bits may be required to indicate whether one or another time slot is left free.

It is known in the art that reducing an amount of information exchanged within a wireless communications network is a key objective for appropriately managing usage of the resources of the wireless communications network. The present invention aims at providing a solution that allows reducing signalling information provided for determining which time and frequency resources are used within the wireless communications network to perform transmissions, while ensuring a certain level of frequency diversity to improve a probability of success of said transmissions.

To that end, the present invention concerns a method for determining time and frequency resources from amongst time and frequency resources of a wireless communications network to be used for performing transmissions in said wireless communications network, the transmissions being performed via time and frequency resources of the wireless communications network according to an initial grid representation. The method is such that a first device in charge of time and frequency resources allocation performs: obtaining groups of time and frequency resources of the wireless communications network so as to form a redrawn grid representation; allocating time and frequency resources according to the redrawn grid representation and according to a frequency hopping criteria; and providing signalling information representative of the time and frequency resources that have been allocated according to the redrawn grid representation. The method is further such that, in order to determine which time and frequency resources of the initial grid representation to be used for performing said transmissions, a second device performs: obtaining the signalling information provided by the first device so as to determine the time and frequency resources that have been allocated according to the redrawn grid representation; and applying a predetermined pattern mask onto the determined time and frequency resources that have been allocated according to the redrawn grid representation, the pattern mask being such that only one time and frequency resource of the initial grid is effectively allocated per time slot in each allocated time and frequency resource of the redrawn grid.

Thus, adaptive time and frequency resources allocation can be achieved with a limited signalling overhead.

According to a particular feature, the first device defines the groups of time and frequency resources by selecting one redrawn grid representation from amongst a first plurality of predefined redrawn grid representations, the first device indicates in the signalling information which redrawn grid representation has been selected, and the second device determines from the signalling information which redrawn grid representation has been selected.

Thus, more flexibility is given to the time and frequency resources allocation via several possibilities of redrawn grids and performance can be improved.

According to a particular feature, the first device selects the redrawn grid by: computing, for each redrawn grid of said first plurality, a first figure of merit representative of robustness to interference for the selected redrawn grid; and selecting the redrawn grid of said first plurality showing the best first figure of merit.

Thus, the redrawn grid is selected so as to be able to improve the robustness to interference and performance is improved.

According to a particular feature, the first device selects one pattern mask from amongst a second plurality of predefined pattern masks, the first device indicates in the signalling information which pattern mask has been selected, and the second device applies said selected pattern mask in order to determine which time and frequency resources of the initial grid to be used for performing said transmissions.

Thus, more flexibility is given to the time and frequency resources allocation via several possibilities of pattern masks and performance can be improved.

According to a particular feature, the first device selects the pattern mask by: computing, for each pattern mask of said second plurality, a second figure of merit representative of robustness to interference for said pattern mask; and selecting the pattern mask of said second plurality showing the best second figure of merit.

Thus, the pattern mask is selected so as to be able to improve the robustness to interference and performance is improved.

According to a particular feature, the first device selects one pattern mask from amongst a second plurality of predefined pattern masks, the first device indicates in the signalling information which pattern mask has been selected, and the second device applies said selected pattern mask in order to determine which time and frequency resources of the initial grid to be used for performing said transmissions. and the first device selects the redrawn grid and the pattern mask by: computing, for each couple of redrawn grid of said first plurality and of pattern mask of said second plurality, a third figure of merit representative of robustness to interference for said couple of redrawn grid and of pattern mask; and selecting the couple of redrawn grid and pattern mask showing the best third figure of merit.

Thus, more flexibility is given to the time and frequency resources allocation via several possibilities of redrawn grids and pattern masks and performance can be improved according to the optimization of the figure of merit.

According to a particular feature, the pattern masks of said second plurality have a same level of orthogonality with each other.

Thus, when different pattern masks are selected for different systems, said different systems equally interfere with each other and there is no need to perform a joint optimization. In other words, no cooperation between said different systems is needed.

According to a particular feature, the groups of the redrawn grid are formed by grouping, for each time slot of the initial grid, adjacent frequencies or frequency bands of the initial grid into frequency super-bands.

Thus, when the interferers have a larger bandwidth than the bandwidth of the system used for transmission, interference avoidance of these interferer is obtained with a limited signalling overhead.

According to a particular feature, an orthogonality factor (OF) is defined between couples of time and frequency resources sequences inside respective frequency super-bands over said v consecutive time slots, as follows:

$$OF(I1,I2)=W(f(I1;1)-f(I2;1))+W(f(I2;1)-f(I1;1))+\ldots+W(f(I1;v)-f(I2;v))+W(f(I2;v)-f(I1;v))$$

wherein I1 and I2 are time and frequency resources sequences defined by two respective pattern masks within one frequency super-band identically formed over a quantity of v consecutive time slots in each redrawn grid to be considered in conjunction with said pattern masks, wherein $W(f1,f2)$ is a measurement of co-channel interference between frequency resources f1 and f2, wherein $f(I1;a)$ is the frequency resource of the time and frequency resources sequence I1 for a time slot a and $f(I2;a)$ is the frequency resource of the time and frequency resources sequence I1 for the time slot a. For ensuring that the pattern masks of said second plurality have a same level of orthogonality with each other, said pattern masks are defined such that, for any sequences Im and Ik representing respective pattern masks of said second plurality, the following relationship is met:

$$|OF(Im,Ik)|\leq D$$

wherein D is a predefined threshold. Thus, intra-super-band interference between pattern masks that can be concurrently used by adjacent cells is reduced.

According to a particular feature, an orthogonality factor (OF) is defined between couples of time and frequency resources sequences inside plural frequency super-bands i,j over said v consecutive time slots, as follows:

$$OF(I'1,I'2)=\max_{i,j}(W(fi(I'1,1)-fj(I'2,1))+W(fi(I'2,1)-fj(I'1,1)))+\ldots+\max_{i,j}(W(fi(I'1,v)-fj(I'2,v))+W(fi(I'2,v)-fj(I'1,v)))$$

wherein I'1 and I'2 are time and frequency resources sequences defined by two respective pattern masks within plural frequency super-bands formed over a quantity of v consecutive time slots in each redrawn grid to be considered in conjunction with said pattern masks, wherein $W(f1,f2)$ is a measurement of co-channel interference between frequency resources f1 and f2, wherein $fi(I'1;a)$ is the frequency resource of the time and frequency resources sequence I'1 for a time slot a in the frequency super-band i, wherein $fi(I'2;a)$ is the frequency resource of the time and frequency resources sequence I'2 for the time slot a in the frequency super-band i, wherein $fj(I'1;a)$ is the frequency resource of the time and frequency resources sequence I'1 for the time slot a in the frequency super-band j, and wherein $fj(I'2;a)$ is the frequency resource of the time and frequency resources sequence I'2 for the time slot a. For ensuring that the pattern masks of said second plurality have a same level of orthogonality with each other, said pattern masks are defined such that, for any sequences I'm and I'k representing respective pattern masks of said second plurality, the following relationship is met:

$$|OF(I'm,I'k)|\leq D$$

wherein D is a predefined threshold. Thus, intra- and inter-super-band interference between pattern masks that can be concurrently used by adjacent cells is reduced.

According to a particular feature, for each time slot of the initial grid, frequency or frequency bands of the initial grid are uniformly or quasi-uniformly distributed in terms of quantity among said frequency super-bands.

Thus, the capability of interference avoidance is the same for all time slots.

According to a particular feature, the initial grid covers frequencies from 2400 MHz to 2480 Mhz, a first frequency super-band groups frequencies from 2400 MHz to 2425 Mhz, a second frequency super-band groups frequencies from 2425 MHz to 2450 Mhz and a third frequency super-band groups frequencies from 2450 MHz to 2480 Mhz.

Thus, interference generated by most popular devices acting in the ISM (Industrial, Scientific and Medical) band can be avoided with a limited signalling overhead.

According to a particular feature, the redrawn grid is such that groups of time and frequency resources are formed by meeting the following constraint:

$$\begin{cases} \sum_{i=1}^{n} N_i = N_t \\ \sum_{i=1}^{n} \lceil N_i \log_2(SB_i) \rceil = B_t \end{cases}$$

wherein:

⌈ ⌉ represents the ceil operator;

n represents a quantity of groups formed from the initial grid;

$N_i$ represents a quantity of time slots of the initial grid present in a group identified by an index i;

$N_t$ represents a quantity of time slots of the initial grid;

$SB_i$ represents a quantity of frequency super-bands for each time slots in the group identified by the index i; and $B_t$ represents a target quantity of signalling bits available to indicate, according to the redrawn grid, which time and frequency resources are allocated to said transmissions.

Thus, the redrawn grid can be defined for a target signalling overhead.

According to a particular feature, allocations according to the redrawn grid representation are considered by sets of a predefined quantity of time slots and are associated with respective signalling words in a codebook, and the signalling information comprises the code of the codebook which is associated with the time and frequency resources that have been allocated by the first communication device according to the redrawn grid representation.

Thus, the amount of data needed to inform of the time and frequency resources allocated according to the redrawn grid is limited.

The present invention also concerns a system for determining time and frequency resources from amongst time and frequency resources of a wireless communications network to be used for performing transmissions in said wireless communications network, the transmissions being intended to be performed via time and frequency resources of the wireless communications network according to an initial grid representation. The system is such that a first device in charge of time and frequency resources allocation comprises: means for obtaining groups of time and frequency resources of the wireless communications network so as to form a redrawn grid representation; means for allocating time and frequency resources according to the redrawn grid representation and according to a frequency hopping criteria; and means for providing signalling information representative of the time and frequency resources that have been allocated according to the obtained redrawn grid representation. The system is further such that, in order to determine which time and frequency resources of the initial grid to be used for performing said transmissions, a second device comprises: means for obtaining the signalling information provided by the first device so as to determine the time and frequency resources that have been allocated according to the redrawn grid representation; and means for applying a predetermined pattern mask onto the determined time and frequency resources that have been allocated according to the redrawn grid representation, the pattern mask being such that only one time and frequency resource of the initial grid is effectively allocated per time slot in each allocated time and frequency resource of the redrawn grid.

Since the features related to the system are similar to those already mentioned with regard to the corresponding aforementioned method, the corresponding advantages are not repeated here.

Figure 2:
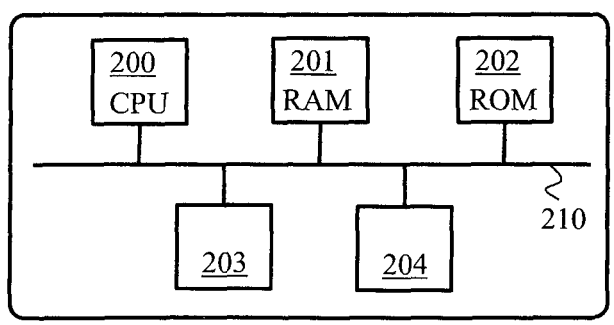
Figure 3:
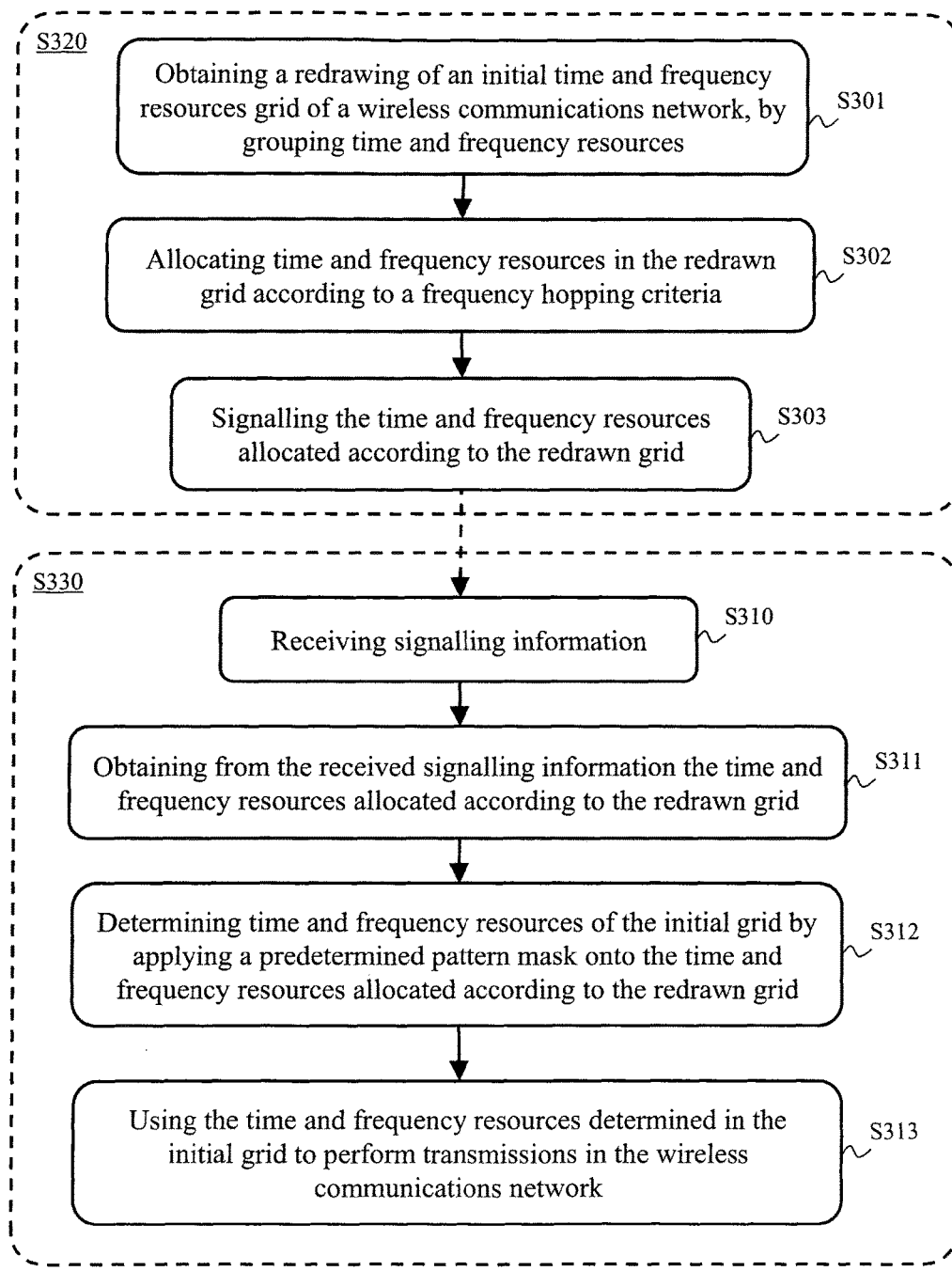
Figure 4:
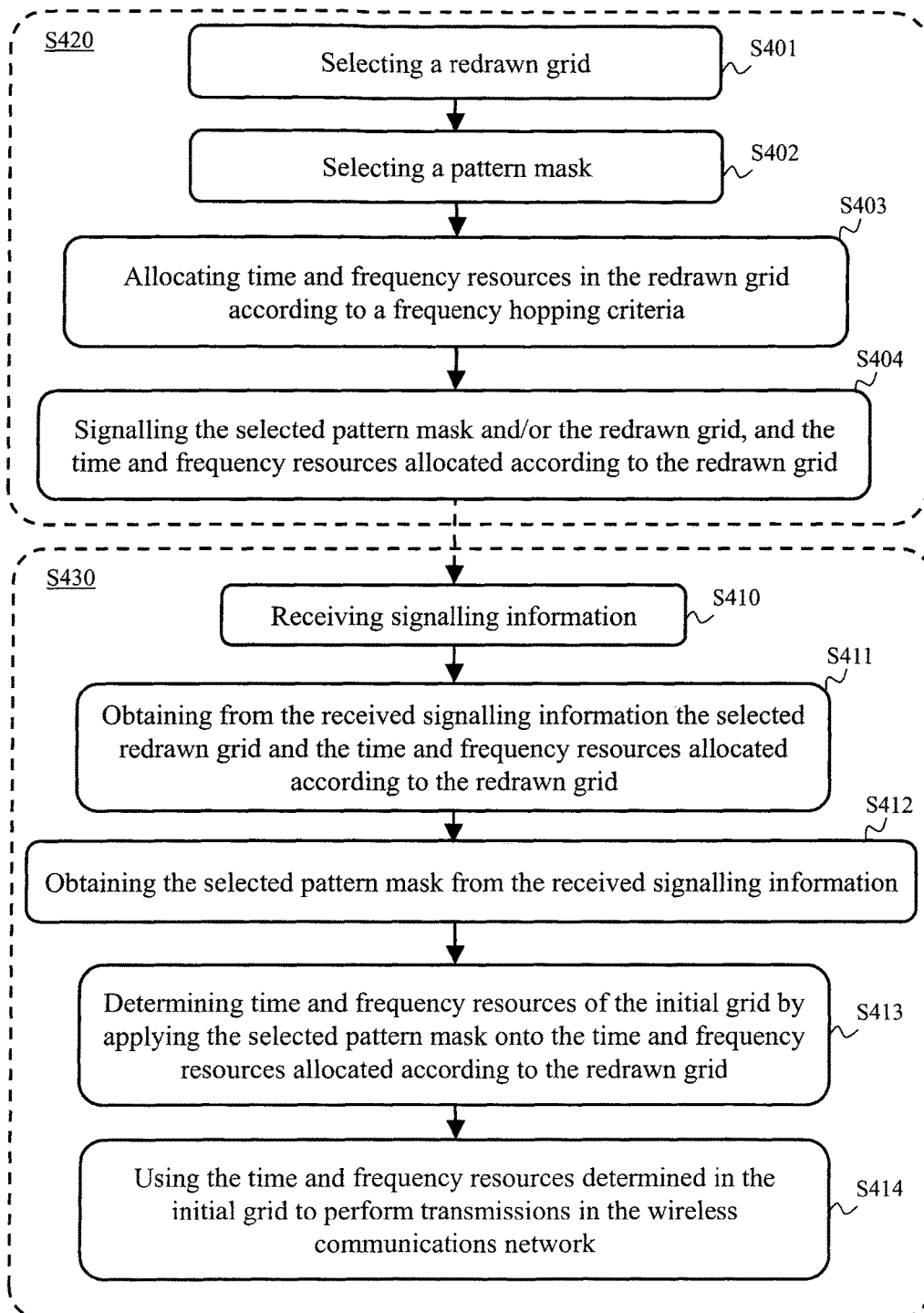
Figure 5:
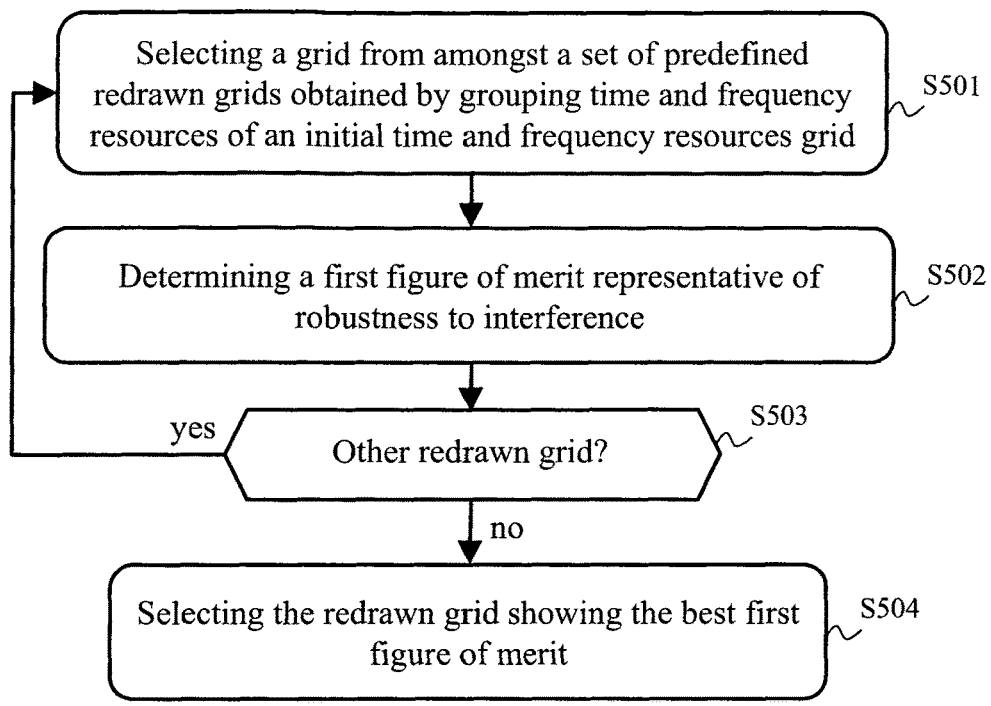
Figure 6:
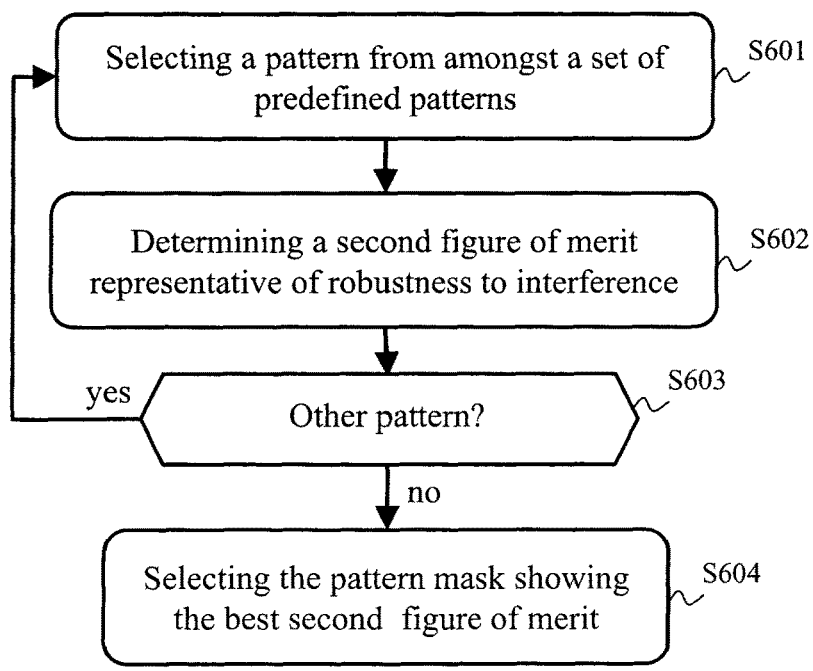
Figure 7:
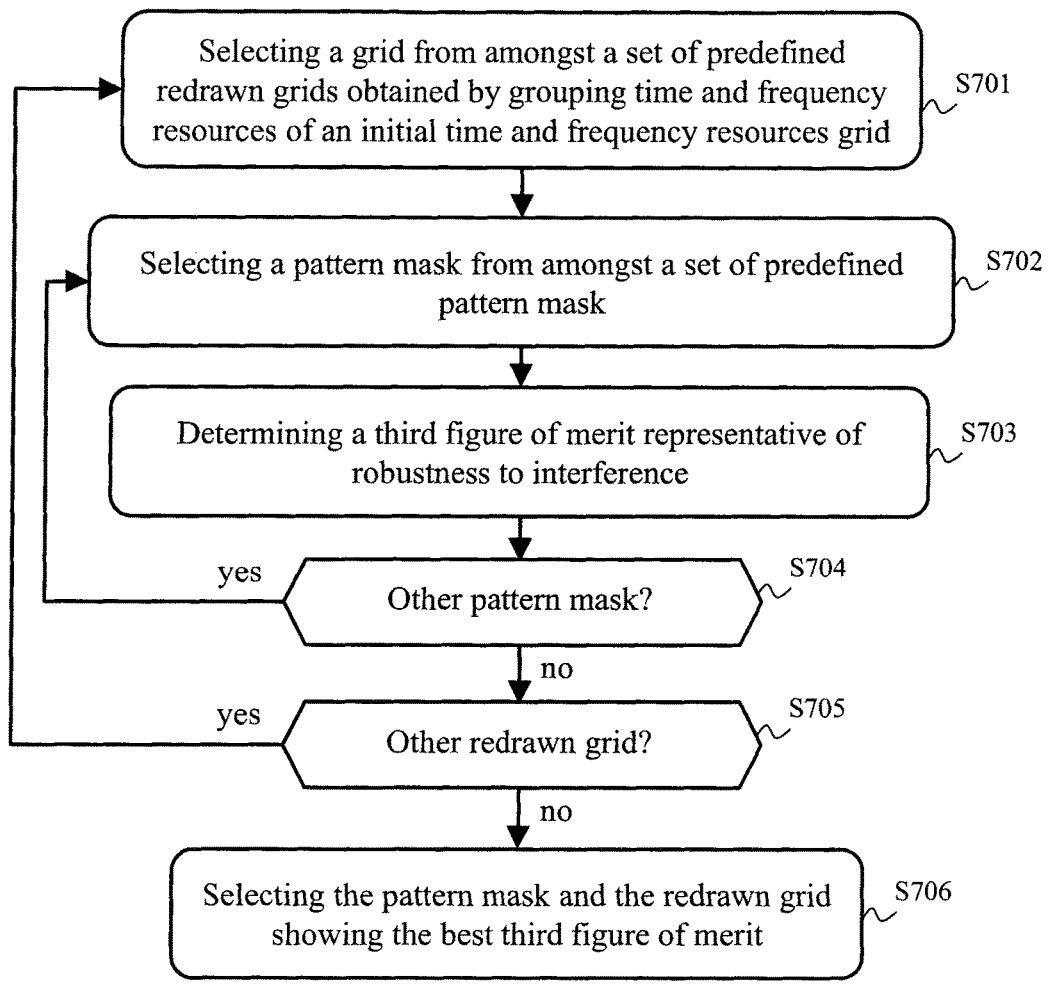
Figure 8A:
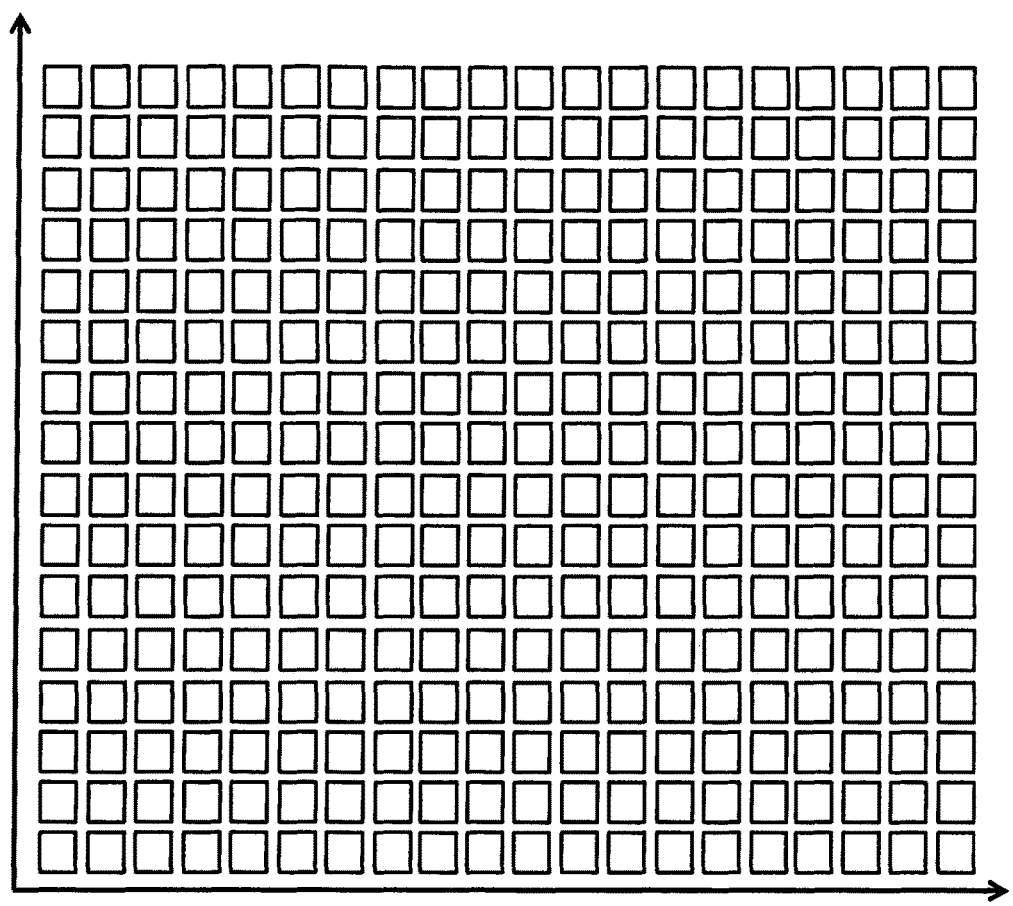
Figure 8B:
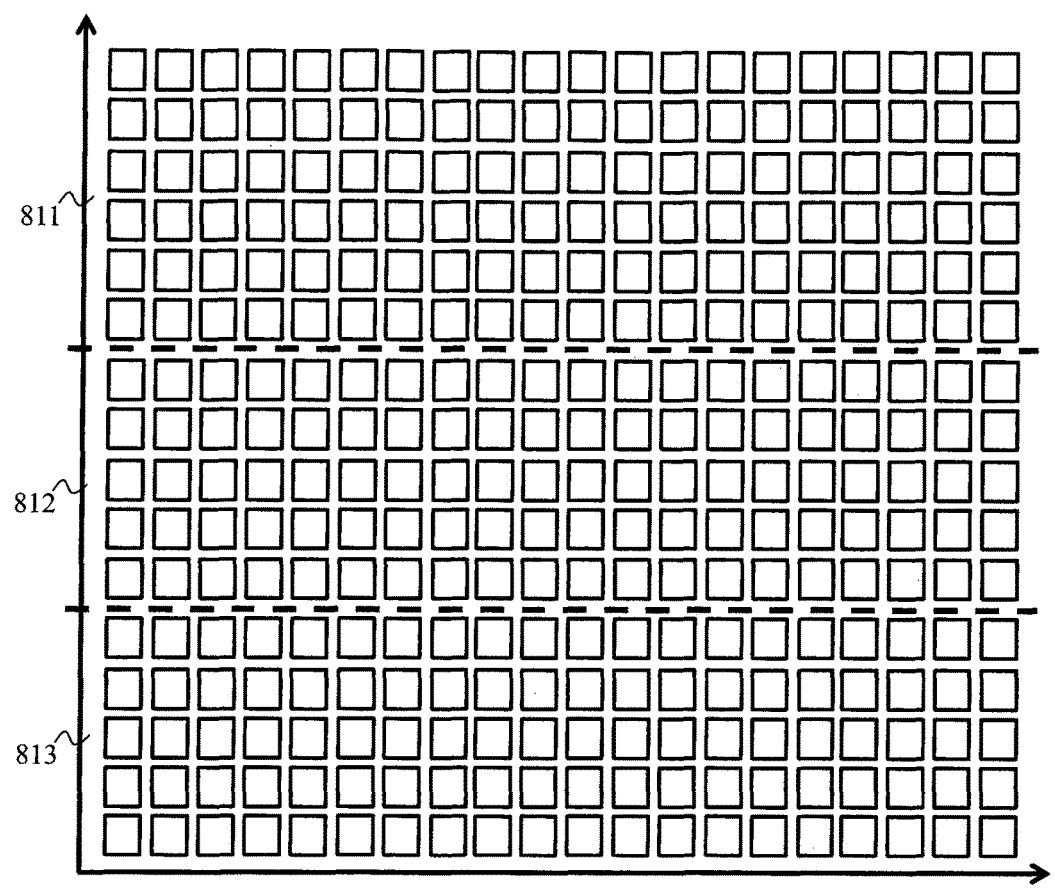
Figure 8C:
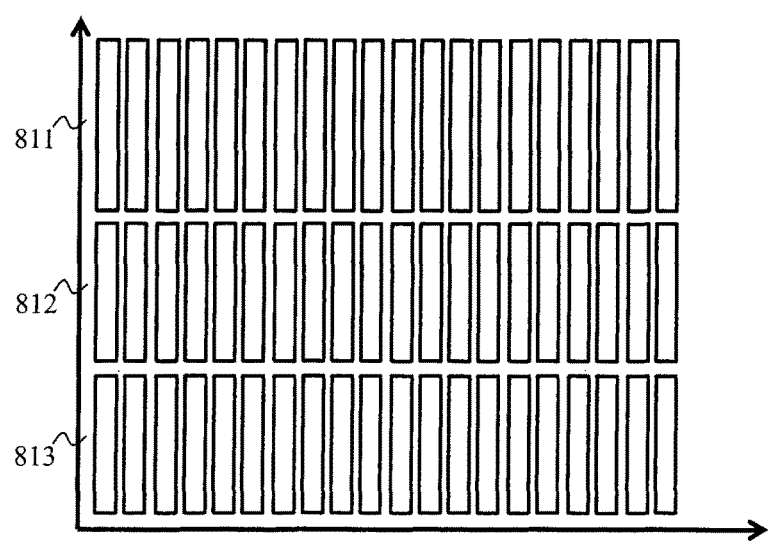
Figure 8D:
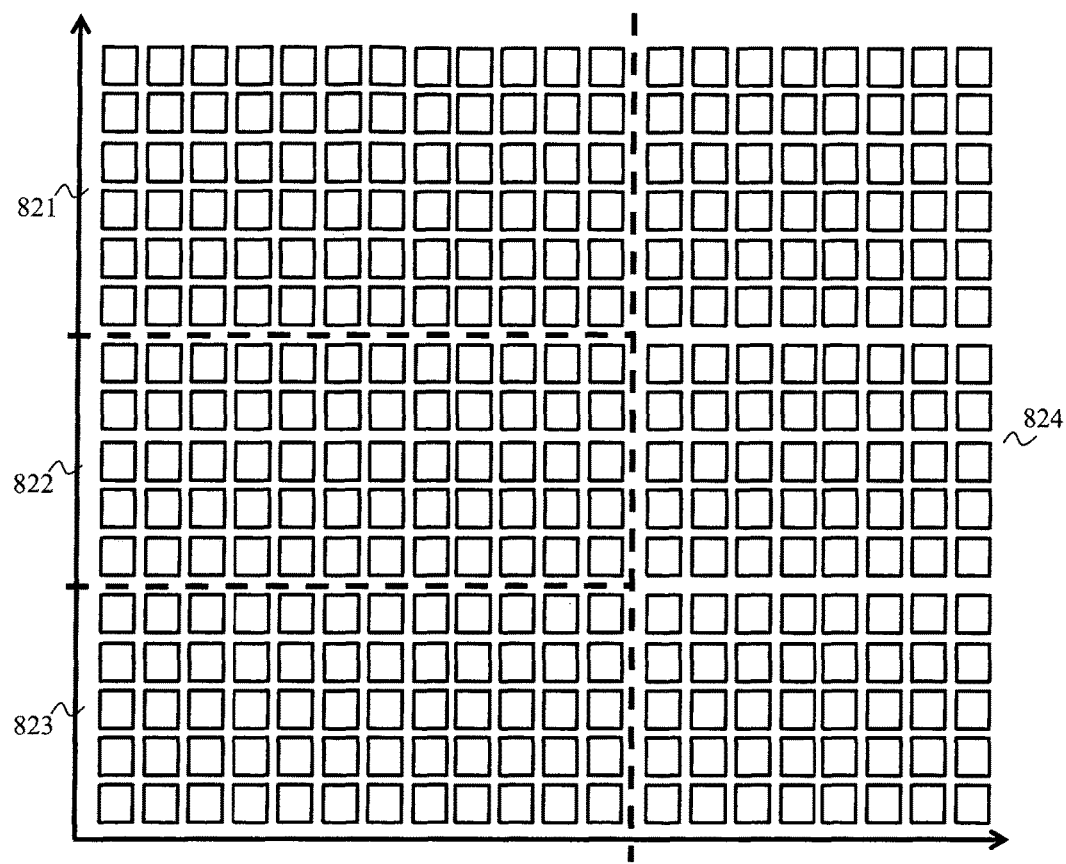
Figure 8E:
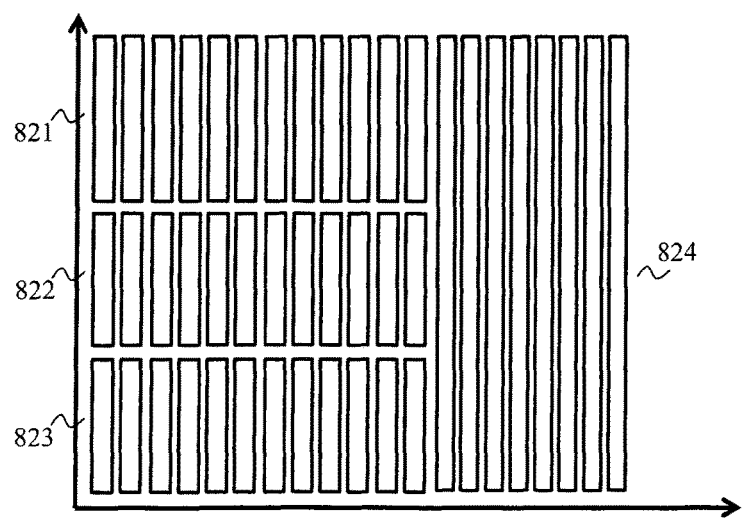
Figure 8F:
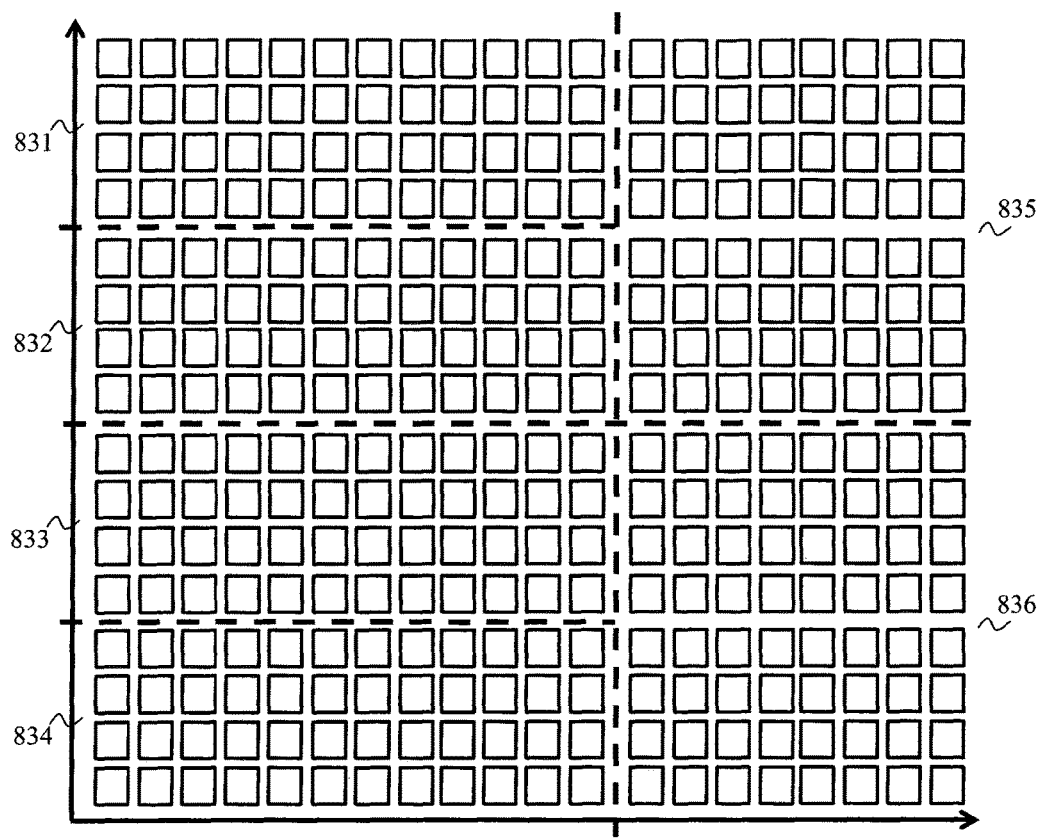
Figure 8G:
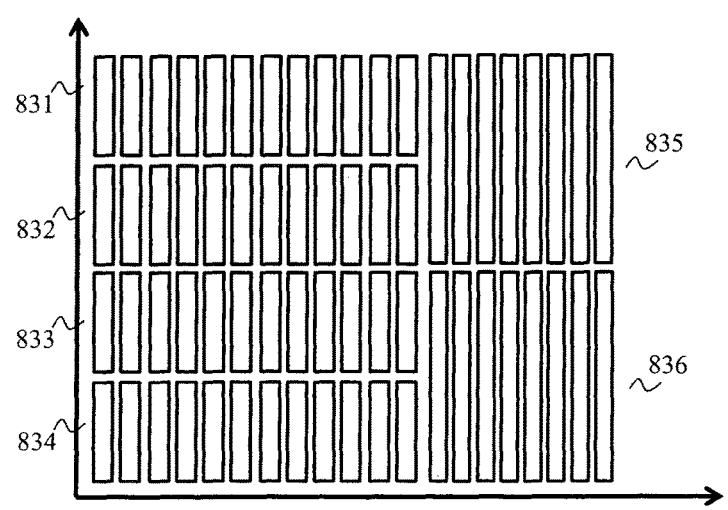
Figure 9A:
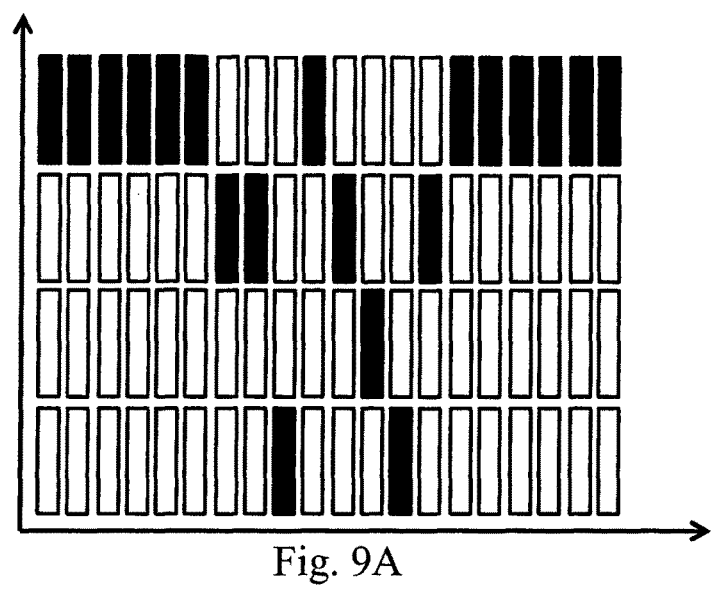
Figure 9B:
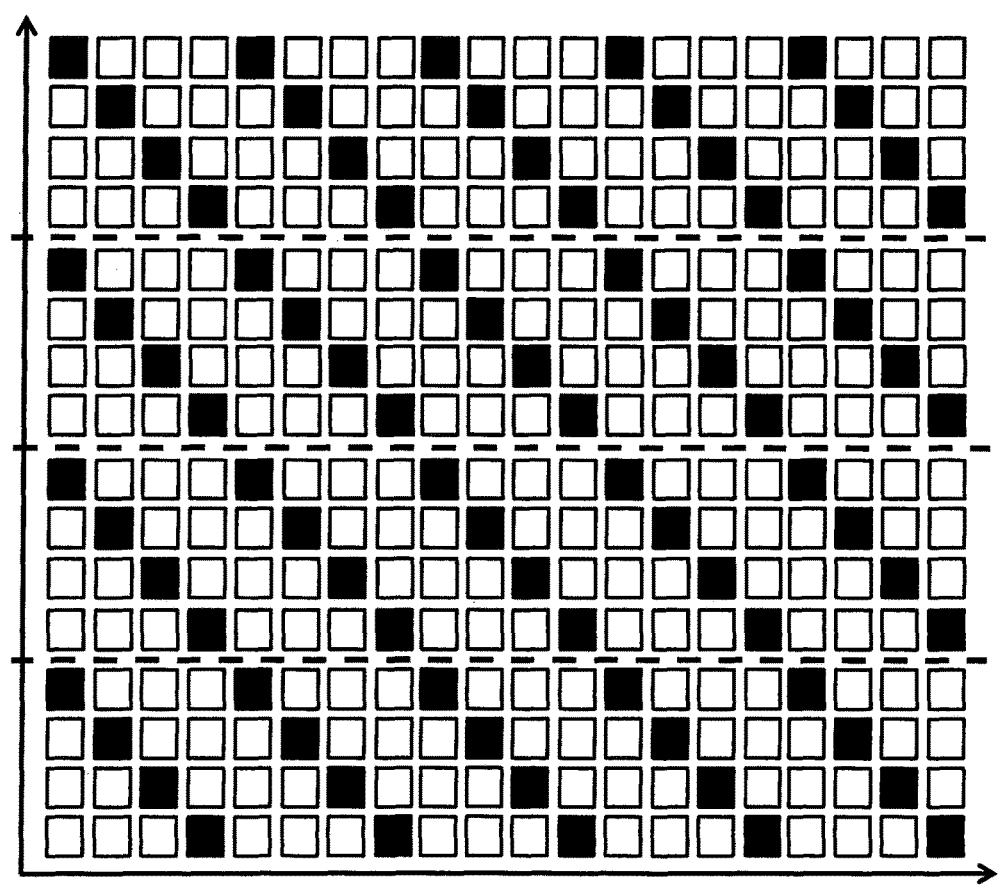
Figure 9C:
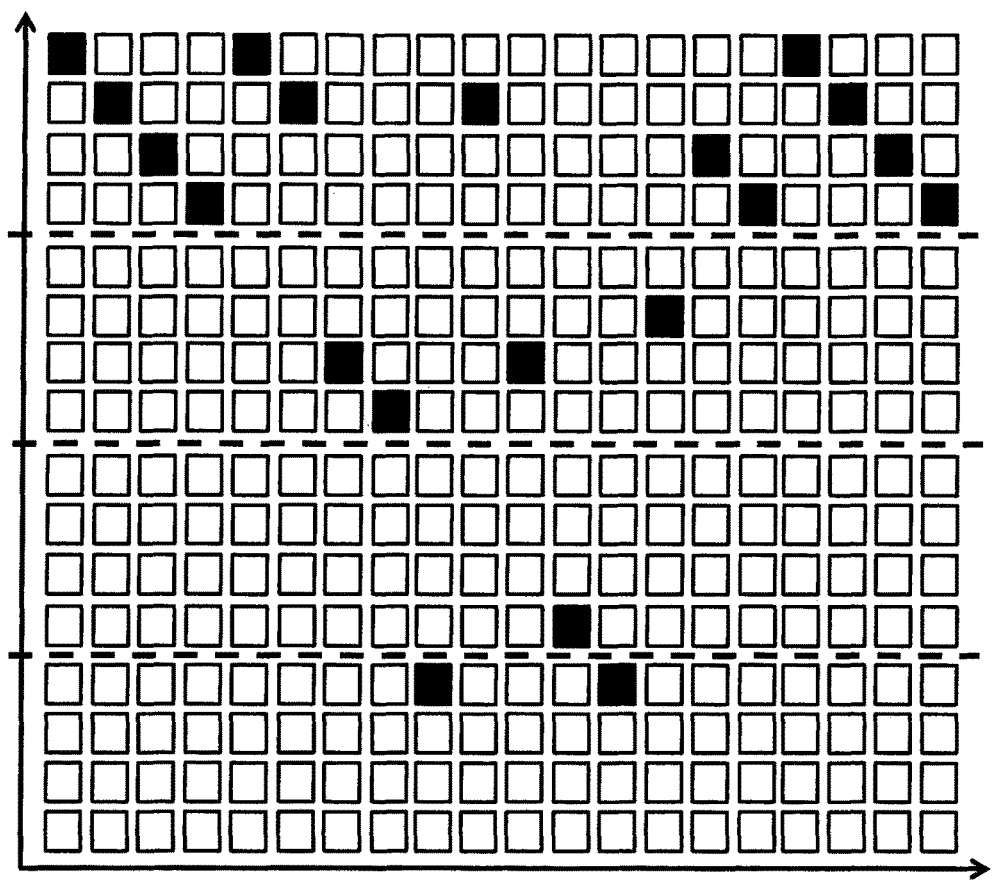

The characteristics of the invention will emerge more clearly from a reading of the following description of an example of embodiment, said description being produced with reference to the accompanying drawings, among which:

FIG. 1 schematically represents a wireless communications network in which the present invention may be implemented;

FIG. 2 schematically represents a communication device of the wireless communications network;

FIG. 3 schematically represents an algorithm for determining time and frequency resources to be used for performing transmissions within the wireless communications network, according to a first embodiment of the present invention;

FIG. 4 schematically represents an algorithm for determining time and frequency resources to be used for performing transmissions within the wireless communications network, according to a second embodiment of the present invention;

FIG. 5 schematically represents an algorithm for determining a redrawn grid of time and frequency resources to be used for signalling time and frequency resources allocation to be used for performing the transmissions within the wireless communications network;

FIG. 6 schematically represents an algorithm for determining a pattern to be used for determining from signalling information time and frequency resources allocation to be used for performing the transmissions within the wireless communications network;

FIG. 7 schematically represents an algorithm for determining a redrawn grid of time and frequency resources to be used for signalling time and frequency resources allocation to be used for performing the transmissions within the wireless communications network, as well as a pattern to be used for determining from signalling information time and frequency resources allocation to be used for performing the transmissions within the wireless communications network;

FIG. 8A schematically represents an initial grid of time and frequency resources, on which the redrawn grid of time and frequency resources is based;

FIGS. 8B and 8C schematically represent a first embodiment of the redrawn grid of time and frequency resources;

FIGS. 8D and 8E schematically represent a second embodiment of the redrawn grid of time and frequency resources;

FIGS. 8F and 8G schematically represent a third embodiment of the redrawn grid of time and frequency resources; and FIGS. 9A, 9B and 9C schematically represent an example of time and frequency resources allocation and signalling according to the present invention.

In order to reduce the amount of signalling information needed to inform communication devices about time and frequency resources allocated to perform transmissions within a wireless communications network, it is proposed to form groups of time and frequency resources in order to build a redrawn grid of time and frequency resources from an initial grid of time and frequency resources in which the time and frequency resources are separately considered. By grouping the time and frequency resources and by performing allocation considering the redrawn grid instead of the initial grid, the amount of signalling information is reduced. In order to avoid that more time and frequency resources be used than effectively necessary, a pattern mask is applied onto the time and frequency resources allocation stipulated by the signalling information. The pattern mask allows reverting to the initial grid of time and frequency resources, whereas the signalling information only refers to the redrawn grid of time and frequency resources, which is inherently less accurate than the initial grid of time and frequency resources.

FIG. 1 schematically represents a wireless communications network in which the present invention may be implemented.

The wireless communications network shown in FIG. 1 comprises a server 100, plural access points APs and plural mobile terminals. Two APs 110, 111 are illustratively represented and two mobile terminals 120, 121 are illustratively represented too.

In FIG. 1, the mobile terminal 120 communicates within the wireless communications network via the AP 110 and the mobile terminal 121 communicates within the wireless communications network via the AP 111, as represented by solid line arrows in FIG. 1. From the standpoint of the mobile terminal 121, downlink communications from the AP 110 to the mobile terminal 120 may interfere with the downlink communications from the AP 111 to the mobile terminal 121. From the standpoint of the mobile terminal 120, downlink communications from the AP 111 to the mobile terminal 121 may interfere with the downlink communications from the AP 110 to the mobile terminal 120. Such interference is represented in FIG. 1 by dashed line arrows. Other interference may be generated by other interferers located in the vicinity of the mobile terminals and/or in the vicinity of the APs.

Coping with such interference can be performed thanks to frequency hopping when allocating time and frequency resources for transmissions. Frequency hopping provides diversity in terms of frequency usage, which allows the transmissions to be resistant to narrowband interference.

The server 100 is in charge of performing time and frequency resources allocations within the wireless communications network. To achieve this, the server 100 communicates with the APs 110, 111 so as to receive and process allocation requests, and to provide information about time and frequency resources allocated by the server 100 in response to the allocation requests to perform transmissions. The APs are in charge of providing signalling information representative of said time and frequency resources allocated by the server 100 to any mobile terminal present in an area, also referred to as cell, covered by said APs.

In a variant, the allocations of time and frequency resources are not performed by a server to which the APs are connected, but by the APs themselves.

The time and frequency resources that may be used for performing transmissions between the AP 110 and the mobile terminal 120 and transmissions between the AP 111 and the mobile terminal 121 can be represented using a so-called initial grid of time and frequency resources. An illustrative representation of such an initial grid of time and frequency resources is shown in FIG. 8A.

In FIG. 8A, the frequency resources are represented as ordinates (vertical axis) and the time resources are represented as abscissa (horizontal axis). Illustratively, the frequency band from 2400 MHz to 2480 MHz is divided into sixteen frequency resources of 5 MHz each. In other words, each row of the grid shown in FIG. 8A represents a 5 MHz wide frequency resource. Illustratively, time is divided into time slots of 4 ms each. A timeframe of twenty time slots is represented by the grid shown in FIG. 8A. Each time slot is considered as a time resource. In other words, each column of the grid shown in FIG. 8A represents a 4 ms wide time resource. Each square represented in the grid of FIG. 8A then corresponds to a time and frequency resource of 5 MHz over 4 ms.

The transmissions shall be performed using time and frequency resources of said initial grid.

As already mentioned, performing signalling according to the initial grid shown in FIG. 8A would necessitate at least eighty bits: four bits per time slot to indicate which frequency resource is allocated, considering that one frequency resource has to be allocated for each time slot of the considered timeframe of twenty time slots. Using a redrawn grid formed by grouping time and frequency resources of the initial grid and a pattern mask to revert back to the initial grid allows reducing the amount of bits needed to perform signalling, as detailed hereafter.

FIG. 2 schematically represents a communication device of the wireless communications network. Such a communication device may be a representation of an AP, such as the AP 110, and/or may be a representation of a mobile terminal, such as the mobile terminal 120, and/or may be a representation of the server 100.

According to the shown architecture, the communication device comprises the following components interconnected by a communications bus 210: a processor, microprocessor, microcontroller or CPU (Central Processing Unit) 200; a RAM (Random-Access Memory) 201; a ROM (Read-Only Memory) 202; an HDD (Hard-Disk Drive) or an SD (Secure Digital) card reader 203, or any other device adapted to read information stored on storage means; at least one communication interface 204.

The communication interface 204 allows the communication device to communicate with at least one other communication device of the wireless communications network.

CPU 200 is capable of executing instructions loaded into RAM 201 from ROM 202 or from an external memory, such as an SD card. After the communication device has been powered on, CPU 200 is capable of reading instructions from RAM 201 and executing these instructions. The instructions form one computer program that causes CPU 200 to perform some or all of the steps of the algorithms described hereafter.

Any and all steps of the algorithms described hereafter may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

FIG. 3 schematically represents an algorithm for determining time and frequency resources to be used for performing transmissions within the wireless communications network, according to a first embodiment of the present invention.

The algorithm of FIG. 3 consists of two parts S320 and S330. The first part S320 concerns a process of allocating time and frequency resources for performing transmissions within the wireless communications network. The first part S320 may be performed by an AP or by the server 100. The second part S330 concerns a process of determining from signalling information which time and frequency resources have been effectively allocated to perform the transmission. The second part S330 may be performed by an AP or by the server 100. Under general considerations, the first part S320 is performed by a first communication device in charge of time and frequency resources allocations in order to enable transmissions within the wireless communications network and the second part S330 is performed by a second communication device willing to determine the time and frequency resources effectively allocated to enable said transmissions within the wireless communications network.

In the algorithm of FIG. 3, the first part S320 is composed of a sequence of steps S301 to S303, and the second part S330 is composed of a sequence of steps S310 to S313.

In the step S301, the first communication device obtains a redrawn grid of time and frequency resources. The redrawn grid is obtained by grouping time and frequency resources of the initial grid. It is considered in the scope of the algorithm of FIG. 3 that the first communication device relies on a static definition of the redrawn grid. The redrawn grid is then either determined beforehand and its definition is provided beforehand within the wireless communications network, for instance at installation or initialisation of the wireless communications network. The definition of the redrawn grid may also be stored in a memory of each communication device of the wireless communications network during manufacturing process and then retrieved by the communication device once powered on. In a variant, as detailed hereafter with regard to FIG. 4, the first communication device relies on a dynamic definition of the redrawn grid.

In other words, the first communication device obtains groups of time and frequency resources of the wireless communications network so as to form a redrawn grid representation. Time and frequency resources allocations performed according to the redrawn grid require thus less signalling bits compared with time and frequency resources allocations performed according to the initial grid, since a lower amount of time and frequency resources are present in the redrawn grid compared with the initial grid due to the formation of groups.

The redrawn grid may be formed by grouping, identically for consecutive time slots of the initial grid, adjacent frequencies or frequency bands of the initial grid into frequency super-bands.

Considering the initial grid of time and frequency resources shown in FIG. 8A, a first example of such a redrawn grid of time and frequency resources is shown in FIGS. 8B and 8C. The redrawn grid shown in FIGS. 8B and 8C is such that, for each time slot of the initial grid, frequency or frequency bands (frequency resources) of the initial grid are quasi-uniformly distributed in terms of quantity among said frequency super-bands. Frequency or frequency bands (frequency resources) of the initial grid may be uniformly distributed in terms of quantity among said frequency super-bands, as illustrated in FIG. 9A.

In FIG. 8B, the redrawn grid of time and frequency resources shown in FIG. 8A is such that frequency resources are grouped in order to form three frequency bands 811, 812 and 813. The frequency bands 811, 812 and 813 are separated from each other in FIG. 8B by dashed lines. The frequency band 811 covers six frequency resources of the initial grid shown in FIG. 8A, namely the six 5 MHz-wide frequency resources from 2450 Mhz to 2480 Mhz. The frequency band 812 covers five frequency resources of the initial grid shown in FIG. 8A, namely the five 5 MHz-wide frequency resources from 2425 Mhz to 2450 Mhz. The frequency band 812 covers five frequency resources of the initial grid shown in FIG. 8A, namely the five 5 MHz-wide frequency resources from 2400 Mhz to 2425 Mhz. In the redrawn grid shown in FIGS. 8B and 8C, no groups of time resources have been formed; only groups of frequency resources have been formed. In FIG. 8C, the time and frequency resources groups that have been formed to create the redrawn grid from the initial grid are shown. The frequency bands 811, 812 and 813 distinctly appear in the redrawn grid representation of FIG. 8C. For each time slot of the considered timeframe, three time and frequency resources allocations can then be performed according to the redrawn grid, i.e. one allocation for each frequency band 811, 812, 813. Comparatively, sixteen allocations can be performed per time slot according to the initial grid shown in FIG. 8A.

Thus, by relying on the redrawn grid representation shown in FIG. 8C, two signalling bits are needed to indicate, for each time slot, which frequency resource is allocated. Two signalling bits further allow indicating that there is no frequency resource allocated for the considered time slot (one value for indicating that there is no frequency resource allocated for the considered time slot, one value for indicating that the frequency band 811 is allocated for the considered time slot, one value for indicating that the frequency band 812 is allocated for the considered time slot and one value for indicating that the frequency band 813 is allocated for the considered time slot). It results in a total number of forty signalling bits, which is significantly less than the at least eighty signalling bits needed when relying on the initial grid.

The groups formed to create the redrawn grid shown in FIG. 8C from the initial grid shown in FIG. 8A are particularly advantageous as each frequency band 811, 812, 813 respectively corresponds to one of the main channel used in Wi-Fi (registered trademark) systems. The frequency band 811 moreover correspond to the frequency band that may be impacted by microwave ovens operations. Therefore, interference resulting from Wi-Fi (registered trademark) devices communications and interference resulting from microwave ovens operations can be easily handled by frequency hopping.

Considering the initial grid of time and frequency resources shown in FIG. 8A, a second example of redrawn grid of time and frequency resources is shown in FIGS. 8D and 8E.

In FIG. 8D, the redrawn grid of time and frequency resources shown in FIG. 8A is such that frequency resources are grouped in order to form three frequency bands 821, 822 and 823 over the twelve first time slots in sequence in the considered timeframe of twenty time slots. The three frequency bands 821, 822 and 823 respectively correspond to the three frequency bands 811, 812, 813 of the redrawn grid shown in FIGS. 8B and 8C. For the eight remaining time slots of the considered timeframe of twenty time slots, all frequency resources are grouped together in a frequency band 824. In the redrawn grid shown in FIGS. 8D and 8E, no groups of time resources have been formed; only groups of frequency resources have been formed. In FIG. 8E, the time and frequency resources groups that have been formed to create the redrawn grid from the initial grid are shown. The frequency bands 821, 822, 823 and 824 distinctly appear in the redrawn grid representation of FIG. 8E. For each time slot among the twelve first time slots in sequence in the considered timeframe of twenty time slots, three time and frequency resources allocations can then be performed according to the redrawn grid, i.e. one allocation for each frequency band 821, 822, 823. For each time slot among the eight remaining time slots of the considered timeframe of twenty time slots, a single allocation can then be performed according to the redrawn grid, i.e. one allocation for the frequency band 824. Here again, comparatively, sixteen allocations can be performed per time slot according to the initial grid shown in FIG. 8A.

Thus, by relying on the redrawn grid representation shown in FIG. 8E, two signalling bits are needed to indicate, for each time slot among the twelve first time slots in sequence in the considered timeframe of twenty time slots, which frequency resource is allocated. Two signalling bits further allow indicating that there is no frequency resource allocated for the considered time slot (one value for indicating that there is no frequency resource allocated for the considered time slot, one value for indicating that the frequency band 821 is allocated for the considered time slot, one value for indicating that the frequency band 822 is allocated for the considered time slot and one value for indicating that the frequency band 823 is allocated for the considered time slot). For the eight remaining time slots of the considered timeframe, one signalling bit is needed to indicate, for each time slot, whether the frequency resource corresponding to the frequency band 824 is allocated. It results in a total number of thirty-two signalling bits, which is significantly less than the at least eighty signalling bits needed when relying on the initial grid. Moreover signalling information having a length of thirty-two bits is advantageously aligned with most computer systems memory width.

Considering the initial grid of time and frequency resources shown in FIG. 8A, a third example of redrawn grid of time and frequency resources is shown in FIGS. 8F and 8G.

In FIG. 8F, the redrawn grid of time and frequency resources shown in FIG. 8A is such that frequency resources are grouped in order to form four frequency bands 831, 832, 833 and 834, for the twelve first time slots in sequence in the considered timeframe of twenty time slots. The frequency bands 831, 832, 833 and 834 are separated from each other in FIG. 8F by dashed lines. The frequency band 831 covers four frequency resources of the initial grid shown in FIG. 8A, namely the four 5 MHz-wide frequency resources from 2460 Mhz to 2480 Mhz. The frequency band 832 covers four frequency resources of the initial grid shown in FIG. 8A, namely the four 5 MHz-wide frequency resources from 2440 Mhz to 2460 Mhz. The frequency band 832 covers four frequency resources of the initial grid shown in FIG. 8A, namely the four 5 MHz-wide frequency resources from 2420 Mhz to 2440 Mhz. The frequency band 834 covers four frequency resources of the initial grid shown in FIG. 8A, namely the four 5 MHz-wide frequency resources from 2400 Mhz to 2420 Mhz. In the redrawn grid shown in FIGS. 8B and 8C, no groups of time resources have been formed; only groups of frequency resources have been formed. For the eight remaining time slots of the considered timeframe of twenty time slots, frequency resources are grouped in order to form two frequency bands 835 and 836. The frequency band 835 covers eight frequency resources of the initial grid shown in FIG. 8A, namely the eight 5 MHz-wide frequency resources from 2440 Mhz to 2480 Mhz. The frequency band 836 covers eight frequency resources of the initial grid shown in FIG. 8A, namely the eight 5 MHz-wide frequency resources from 2400 Mhz to 2440 Mhz. In FIG. 8G, the time and frequency resources groups that have been formed to create the redrawn grid from the initial grid are shown. The frequency bands 831, 832, 833, 834, 835 and 836 distinctly appear in the redrawn grid representation of FIG. 8G. For each time slot among the twelve first time slots in sequence in the considered timeframe of twenty time slots, four time and frequency resources allocations can then be performed according to the redrawn grid, i.e. one allocation for each frequency band 831, 832, 833, 834. For each time slot among the eight remaining time slots of the considered timeframe of twenty time slots, two allocations can then be performed according to the redrawn grid, i.e. one allocation for each frequency band 835, 836. Here yet again, comparatively, sixteen allocations can be performed per time slot according to the initial grid shown in FIG. 8A.

Thus, by relying on the redrawn grid representation shown in FIG. 8G, two signalling bits are needed to indicate, for each time slot among the twelve first time slots in sequence in the considered timeframe of twenty time slots, which frequency resource is allocated. It is in this case considered that one frequency resource is allocated for each one of the time slots of the considered timeframe. For the eight remaining time slots of the considered timeframe, one signalling bit is needed to indicate, for each time slot, which frequency resource among the frequency bands 835, 836 is allocated. It results in a total number of thirty-two signalling bits, which is significantly less than the at least eighty signalling bits needed when relying on the initial grid. Moreover signalling information having a length of thirty-two bits is advantageously aligned with most computer systems memory width.

The redrawn grid of time and frequency resources may take various other forms. Although FIGS. 8B to 8G show groups formed along the frequency resources axis of the initial grid, groups may be formed along the time resources axis instead. Groups may also be formed along both frequency resources axis and time resources axis.

In a more general approach, the groups formed to create the redrawn grid meet the following constraint:

$$\begin{cases} \sum_{i=1}^{n} N_i = N_t \\ \sum_{i=1}^{n} \lceil N_i \log_2(SB_i) \rceil = B_t \end{cases}$$

$\lceil \ \rceil$ represents the ceil operator;

n represents a quantity of groups formed from the initial grid;

$N_i$ represents a quantity of time slots (time resources) of the initial grid present in a group identified by an index i;

$N_t$ represents a quantity of time slots (time resources) of the initial grid, i.e. $N_t$=20 according to the initial grid shown in FIG. 8A;

$SB_i$ represents a quantity of frequency super-bands for each time slots (time resource) in the group identified by the index i; and $B_t$ represents a target quantity of signalling bits available to indicate, according to the redrawn grid, which time and frequency resources are allocated to said transmissions.

The description above, and more particularly the illustrative examples of signalling information, relies on a per time slot signalling, i.e. a quantity of N (N>0) signalling bits is provided to indicate for each time slot which frequency resource has been allocated in said time slot by the first communication device. In another embodiment, all the allocations on the twenty time slots are signalled altogether by using a mapping between all the allocations possibilities ($3^{20}$ allocation possibilities when three frequency super-bands are defined over the twenty time slots) and signalling words of predefined length, e.g. thirty two bits. Said mapping may be represented in a codebook. To reduce the size of the codebook, allocations may be considered by sets of a predefined quantity of time slots, e.g. five time slots considered together. One signalling word is therefore assigned to each possible allocation of the predefined quantity of time slots. Thus, when considering the redrawn grid shown in FIG. 8C and when considering signalling words representative of allocations of five time slots together, $3^5$ allocations possibilities exist (three frequency super-bands are defined over the twenty time slots in FIG. 8C), which can be represented by signalling words of length equal to eight bits. Finally, the signalling for the twenty allocations requires four allocations of sets of five time slots. It results in a total quantity of thirty-two signalling bits, which is significantly less than the at least eighty signalling bits needed when relying on the initial grid. Moreover signalling information having a length of thirty-two bits is advantageously aligned with most computer systems memory width.

Turning back to FIG. 3, in the following step S302, the first communication device allocates time and frequency resources according to the obtained redrawn grid representation, in order to enable said transmissions. In other words, the first communication device performs allocation by relying on the obtained redrawn grid representation. Therefore, a time and frequency resource that has been grouped with at least one other time and frequency resource to form the obtained redrawn grid representation cannot be independently allocated. The allocation of time and frequency resources is performed according to a frequency hopping criteria so as to provide frequency diversity and robustness to interference to said transmissions and therefore improve performance, i.e. probability of success, of said transmissions.

In the following step S303, the first communication device provides signalling information within the wireless communications network. For instance, when the first communication device is the AP 110, the AP 110 transmits said signalling information to the mobile terminal 120 so as to enable the mobile terminal 120 to determine which time and frequency resources have been allocated to said transmissions. In this case, said transmissions are downlink transmissions from the AP 110 to the mobile terminal 120 and for which the mobile terminal 120 needs to know which time and frequency resources are used by the AP 110 to perform said downlink transmissions, and/or said transmissions are uplink transmissions from the mobile terminal 120 to the AP 110 and for which the mobile terminal 120 needs to know which time and frequency resources to be used by the mobile terminal 120 to perform said uplink transmissions.

The signalling information is at least representative of which time and frequency resources have been allocated, according to the obtained redrawn grid of time and frequency resources, in order to enable said transmissions.

In the following step S310, the second communication device receives the signalling information transmitted by the first device in the step S303.

In the following step S311, the second communication device obtains from the received signalling information the time and frequency resources, which have been allocated in the step S302 according to the redrawn grid.

In the following step S312, the second communication device applies a predetermined pattern mask onto the determined time and frequency resources that have been allocated according to the redrawn grid representation. Applying the predetermined pattern mask allows the second communication device to determine which time and frequency resources of the initial grid have effectively to be used for performing said transmissions, although the signalling information only refers to the redrawn grid. When applied onto a group of time and frequency resources of the redrawn grid, the predetermined pattern mask allows the second communication device to determine which time and frequency resources of said group have effectively to be used to perform said transmissions. The pattern mask is such that only one time and frequency resource of the initial grid is effectively allocated per time slot in each allocated time and frequency resource of the redrawn grid. This ensures that, after applying the pattern mask onto the time and frequency resources allocated according to the redrawn grid, only one time and frequency resource of the initial grid is allocated per time slot.

It is considered in the scope of the algorithm of FIG. 3 that the second communication device relies on a static definition of the pattern mask. The pattern mask is then determined beforehand and its definition is provided beforehand within the wireless communications network, for instance at installation or initialisation of the wireless communications network. The definition of the pattern mask may also be stored in a memory of each communication device of the wireless communications network during manufacturing process and then retrieved by the communication device once powered on. In a variant, as detailed hereafter with regard to FIG. 4, the second communication device relies on a dynamic definition of the pattern mask.

In the following step S313, the time and frequency resources identified in the step S312 according to the initial grid representation are used to perform said transmissions. For instance, when the second communication device is the mobile terminal 120, the mobile terminal 120 uses the time and frequency resources identified in the step S312 to receive data via downlink communications from the AP 110 and/or to transmit data via uplink communications to the AP 110.

Let's consider an illustrative result of execution of the algorithm of FIG. 3, as shown in FIGS. 9A to 9C. FIG. 9A represents a redrawn grid as obtained by performing the step S301. Considering the initial grid shown in FIG. 8A, the time and frequency resources are grouped in order to form four frequency bands. Groups are thus formed on a per time slot basis. Each group therefore consists of four time and frequency resources of the initial grid.

In FIG. 9A, black rectangles represent time and frequency resources that have been allocated for said transmissions in the step S302. White rectangles represent time and frequency resources that have not been allocated for said transmissions in the step S302. The signalling information provided by the first communication device in the step S303 is therefore representative of the black rectangles shown in FIG. 9A.

FIG. 9B represents a pattern mask that can be used to determine which time and frequency resources of the initial grid has to be used to perform said transmissions. The pattern mask is represented onto the initial grid of time and frequency resources. For clarity considerations, the frequency bands that allowed forming the groups of the redrawn grid are shown thanks to dashed lines, although the definition of such frequency bands is out of the scope of the pattern mask. The black squares represented in FIG. 9B correspond to the time and frequency resources that may be used to perform transmissions, whereas the white squares correspond to the time and frequency resources that can not be used to perform transmissions.

It can be noted that, when superimposing the pattern mask of FIG. 9B and the redrawn grid of FIG. 9A, only one resource of the initial grid is marked by a black square in each group of the redrawn grid. This ensures that, after applying the mask onto the time and frequency resources allocated according to the redrawn grid, only one resource of the initial grid is allocated per time slot.

FIG. 9C represents the time and frequency resources, of the initial grid, which have to be used to perform said transmissions. The black squares represented in FIG. 9C correspond to the time and frequency resources to be used to perform the transmissions, whereas the white squares correspond to the time and frequency resources not to be used to perform transmissions. The time and frequency resources to be used to perform the transmissions are thus obtained by superimposing the grids shown in FIGS. 9A and 9B. Time and frequency resources allocated according to the redrawn grid (black rectangles in FIG. 9A) are only considered; then, inside said time and frequency resources allocated according to the redrawn grid, only the time and frequency resources marked in the pattern mask (black squares in FIG. 9B) are considered as the time and frequency resources to be used to perform the transmissions.

FIG. 4 schematically represents an algorithm for determining time and frequency resources to be used for performing transmissions within the wireless communications network, according to a second embodiment of the present invention. The difference between the algorithm of FIG. 4 and the algorithm of FIG. 3 lies in that, in the algorithm of FIG. 4, the redrawn grid and/or the pattern mask are dynamically selected.

The algorithm of FIG. 4 consists of two parts S420 and S430. The first part S420 concerns a process of allocating time and frequency resources for performing transmissions within the wireless communications network. The first part S420 may be performed by an AP or by the server 100. The second part S430 concerns a process of determining from signalling information which time and frequency resources have been effectively allocated to perform the transmission. The second part S430 may be performed by an AP or by the server 100. Under general considerations, the first part S420 is performed by a first communication device in charge of time and frequency resources allocations in order to enable transmissions within the wireless communications network and the second part S430 is performed by a second communication device willing to determine the time and frequency resources effectively allocated to enable said transmissions within the wireless communications network.

In the algorithm of FIG. 4, the first part S420 is composed of a sequence of steps S401 to S403, and the second part S430 is composed of a sequence of steps S410 to S414.

In the step S401, the first communication device selects a redrawn grid from a set of predefined redrawn grids of time and frequency resources. The predefined redrawn grids are obtained by grouping time and frequency resources of the initial grid, as already described with regard to FIG. 3. Dynamic selection of the redrawn grid is described hereafter in a particular embodiment with regard to FIG. 5.

In the following step S402, the first communication device selects a pattern mask from a set of predefined pattern masks. Dynamic selection of the pattern mask is described hereafter in a particular embodiment with regard to FIG. 6.

Dynamic respective selections of the redrawn grid and of the pattern mask may be jointly performed. Joint dynamic selections of the redrawn grid and of the pattern mask are described hereafter in a particular embodiment with regard to FIG. 7.

Moreover, although FIG. 4 represents dynamic selections of the redrawn grid and of the pattern mask, only the redrawn grid or the pattern mask may be dynamically selected by the first communication device.

In the following step S403, the first communication device allocates time and frequency resources according to the selected redrawn grid, in order to enable said transmissions. In other words, the first communication device performs allocation by relying on the selected redrawn grid. The allocation of time and frequency resources is performed according a frequency hopping criteria so as to provide frequency diversity to said transmissions.

Since the redrawn grid is based on the initial grid wherein groups of time and frequency resources have been formed, it means that less signalling bits are needed to inform the second communication device about allocated time and frequency resources.

In the following step S404, the first communication device provides signalling information within the wireless communications network. For instance, when the first communication device is the AP 110, the AP 110 transmits said signalling information to the mobile terminal 120 so as to enable the mobile terminal 120 to determine which time and frequency resources have been allocated to said transmissions. In this case, said transmissions are downlink transmissions from the AP 110 to the mobile terminal 120 and for which the mobile terminal 120 needs to know which time and frequency resources are used by the AP 110 to perform said downlink transmissions, and/or said transmissions are uplink transmissions from the mobile terminal 120 to the AP 110 and for which the mobile terminal 120 needs to know which time and frequency resources to be used by the mobile terminal 120 to perform said uplink transmissions.

The signalling information is at least representative of which time and frequency resources have been allocated, according to the obtained redrawn grid of time and frequency resources, in order to enable said transmissions. When the redrawn grid has been dynamically selected by the first communication device, the signalling information is further representative of said selected redrawn grid. When the pattern mask has been dynamically selected by the first communication device, the signalling information is further representative of said selected pattern mask.

In the following step S410, the second communication device receives the signalling information transmitted by the first device in the step S403.

In the following step S411, the second communication device obtains from the received signalling information the time and frequency resources, which have been allocated in the step S302 according to the redrawn grid.

In the following step S412, the second communication device obtains, from the received signalling information, information representative of the pattern mask to be applied to determine which time and frequency resources of the initial grid have to be used to perform said transmissions.

In the following step S413, the second communication device applies the obtained pattern mask onto the determined time and frequency resources that have been allocated according to the redrawn grid representation.

Identically as for the algorithm of FIG. 3, applying the obtained pattern mask allows the second communication device to determine which time and frequency resources of the initial grid representation have effectively to be used for performing said transmissions, although the signalling information only refers to the redrawn grid representation.

In one embodiment, when the first communication device selects the pattern mask from amongst a set of predefined pattern masks, said pattern masks have a same level of orthogonality with each other. Such an arrangement is particularly useful when the server 100 selects the pattern masks on behalf of the APs. In this case, the server 100 is able to ensure that time and frequency resources used in adjacent cells are orthogonal or observe a same level of interference one with each other.

To achieve this, an orthogonality factor (OF) may be defined as a function of co-channel (the channel being the frequency spectrum in which the frequency hopping mechanism described herein applies, e.g. the ISM frequency band) interference depending on a frequency distance between two frequency resources. When defining the pattern masks, an objective is to equalize the orthogonality factor (OF) between said pattern masks. It is reminded that the pattern masks are such that only one time and frequency resource of the initial grid is effectively allocated per time slot in each allocated time and frequency resource of the redrawn grid.

In a first embodiment, let $W(f1-f2)$ be a measurement of co-channel interference between frequency resources f1 and f2. Let I1 and I2 be time and frequency resources sequences defined by two respective pattern masks within one said frequency super-band identically formed over a quantity of v consecutive time slots in each redrawn grid to be considered in conjunction with said pattern masks. I1 corresponds to a first time and frequency resources sequence $[f(I1,1), \ldots, f(I1,v)]$ and I2 corresponds to a second time and frequency resources sequence $[f(I2,1), \ldots, f(I2,v)]$. According to a first example, when considering the redrawn grid shown in FIG. 8C, three frequency super-bands are defined over the twenty time slots of the considered timeframe. The orthogonality factor (OF) can then be computed between couples of time and frequency resources sequences inside each said frequency super-band over said twenty time slots (v=20). According to a second example, when considering the redrawn grid shown in FIG. 8E, three frequency super-bands are defined over the twelve first time slots in sequence of the considered timeframe and one frequency super-band is defined over the eight last time slots in sequence of the considered timeframe. The orthogonality factor (OF) can be computed between couples of time and frequency resources sequences inside each said frequency super-band over said twelve first time slots in sequence of the considered timeframe. A first part of the pattern masks can thus be defined for said twelve first time slots in sequence of the considered timeframe (v=12). The orthogonality factor (OF) can then be computed between couples of time and frequency resources sequences inside each said frequency super-band over said eight last time slots in sequence of the considered timeframe. A second part of the pattern masks can thus be defined for said eight last time slots in sequence of the considered timeframe (v=8).

The orthogonality factor OF is defined as follows:

$$OF(I1,I2) = W(f(I1;1) - f(I2;1)) + W(f(I2;1) - f(I1;1)) + \ldots + W(f(I1;v) - f(I2;v)) + W(f(I2;v) - f(I1;v))$$

Then, a set of pattern masks is selected such that, for any sequences Im and Ik representing respective pattern masks of said set, the following relationship is met:

$$|OF(Im,Ik)| \leq D$$

wherein D is a predefined threshold.

Thus, the robustness to intra-super-band interference between each couple of sequences I1 and I2 leading to the selected pattern masks is improved.

In a second embodiment, when plural frequency super-bands are defined by the redrawn grid for at least one time slot, intra- and inter-super-band interference may exist between two pattern masks. The second embodiment aims at improving said intra- and inter-super-band interference. Let W(f1-f2) be a measurement of co-channel interference between frequency resources f1 and f2. Let I'1 be a time and frequency resources sequence defined by a first pattern mask within a first said frequency super-band i identically formed over a quantity of v consecutive time slots in the redrawn grid to be considered in conjunction with said pattern mask and within a second said frequency super-band j identically formed over said v consecutive time slots in said redrawn grid. One should note that, when i≠j, inter-super-band interference is considered; and, when i=j, intra-super-band interference is considered. Let I'2 be a time and frequency resources sequence defined by a second pattern mask within said first frequency super-band and within second said frequency super-band over said v consecutive time slots in said redrawn grid. I'1 corresponds to a first time and frequency resources sequence [fi(I'1;1), fj(I'1;1), . . . , fi(I'1;v), fj(I'1;v)] and I'2 corresponds to a second time and frequency resources sequence [fi(I'2;1), fj(I'2;1), . . . fi(I'2;v), fj(I'2;v)]. The orthogonality factor (OF) can be computed between couples of time and frequency resources sequences inside plural frequency super-bands over said v consecutive time slots.

The orthogonality factor OF is defined as follows:

$$OF(I'1,I'2) = \max_{i,j}(W(fi(I'1,1) - fj(I'2,1)) + W(fi(I'2,1) - fj(I'1,1))) + \ldots + \max_{i,j}(W(fi(I'1,v) - fj(I'2,v)) + W(fi(I'2,v) - fj(I'1,v)))$$

Then, a set of pattern masks is selected such that, for any sequences I'm and I'k representing respective pattern masks of said set, the following relationship is met:

$$|OF(I'm,I'k)| \leq D$$

Thus, the robustness to inter-super-band and intra-super-band interference between each couple of sequences I'1 and I'2 leading to the selected pattern masks is improved.

FIG. 5 schematically represents an algorithm for determining a redrawn grid of time and frequency resources to be used for signalling allocation of time and frequency resources to be used for performing said transmission within the wireless communications network.

In a step S501, the first communication device selects a redrawn grid from amongst a set of predefined redrawn grids obtained by grouping time and frequency resources of the initial grid of time and frequency resources.

In a following step S502, the first communication device computes a first figure of merit representative of robustness to interference for the selected redrawn grid. Figures of merit are quantities, resulting for an application of a predefined function, used to characterize performance of sequences of time and frequency resources that may be allocated to perform said transmissions.

For example, when knowledge on the Signal to Interference plus Noise Ratio (SINR) is made available to the first communication device, for each time slot and frequency resource, the first communication device is able to compute a performance metric that must be maximized, such as channel capacity. Thus, by combining the selected redrawn grid and the pattern mask to be applied by the second communication device (said pattern mask being fixed in the scope of the algorithm of FIG. 5), an equivalent achievable average data rate may be computed for n transmissions thanks to the following mathematical expression:

$$\frac{1}{n} \sum_{k=0}^{n} \log_2(1 + SINR(k))$$

wherein SINR(k) is the SINR expected in the k-th time and frequency resource selected according to the selected redrawn grid and the pattern mask.

In a following step S503, the first communication device checks whether at least one other redrawn grid from amongst the set of predefined redrawn grids remains to be processed. When at least one such other redrawn grid remains to be processed, the step S501 is repeated by selecting one such other redrawn grid; otherwise, a step S504 is performed.

In the step S504, the first communication device selects the redrawn grid from amongst the set of predefined redrawn grids which shows the best first figure of merit. The selected redrawn grid is then used by the first communication device in order to perform time and frequency resources allocation and further provide the corresponding signalling information. Since the algorithm of FIG. 5 allows the first communication device to dynamically select the appropriate redrawn grid, the signalling information provided by the first communication device shall be representative of the selected redrawn grid from amongst the set of predefined redrawn grids. For instance, when the cardinality of the set of predefined redrawn grids is equal to four, two signalling bits can be used to indicate which redrawn grid from amongst the set of predefined redrawn grids has been selected by the first communication device, when the second communication device has a priori knowledge of the set of predefined redrawn grids. Such signalling bits can then be an index of the selected redrawn grid among the set of predefined redrawn grids. Such signalling bits don't need to be transferred each time signalling information has to be provided. The redrawn grid may be selected and used for plural successive allocations of time and frequency resources.

FIG. 6 schematically represents an algorithm for determining a pattern mask to be used for determining from signalling information time and frequency resources allocation to be used for performing said transmissions within the wireless communications network.

In a step S601, the first communication device selects a pattern mask from amongst a set of predefined pattern masks.

In a following step S602, the first communication device computes a second figure of merit representative of robustness to interference for the selected pattern mask.

For example, when knowledge on the Signal to Interference plus Noise Ratio (SINR) is made available to the first communication device, for each time slot and frequency resource, the first communication device is able to compute a performance metric that must be maximized, such as channel capacity. Thus, by combining the redrawn grid (said redrawn grid being fixed in the scope of the algorithm of FIG. 6) and the selected pattern mask, an equivalent achievable average data rate may be computed for n transmissions thanks to the following mathematical expression:

$$\frac{1}{n}\sum_{k=0}^{n} \log_2(1 + SINR(k))$$

wherein SINR(k) is the SINR expected in the k-th time and frequency resource selected according to the redrawn grid and the selected pattern mask.

In a following step S603, the first communication device checks whether at least one other pattern mask from amongst the set of predefined pattern masks remains to be processed. When at least one such other pattern mask remains to be processed, the step S601 is repeated by selecting one such other pattern mask; otherwise, a step S604 is performed.

In the step S604, the first communication device selects the pattern mask from amongst the set of predefined pattern masks which shows the best second figure of merit. The selected pattern mask is then used by the second communication device in order to determine the time and frequency resources of the initial grid representation to be used to perform said transmissions. Since the algorithm of FIG. 6 allows the first communication device to dynamically select the appropriate pattern mask, the signalling information provided by the first communication device shall be representative of the selected pattern mask from amongst the set of predefined pattern masks, when the second communication device has a priori knowledge of the set of predefined pattern masks. Such signalling bits can then be an index of the selected pattern mask among the set of predefined pattern masks. For instance, when the cardinality of the set of predefined pattern masks is equal to four, two signalling bits can be used to indicate which pattern mask from amongst the set of predefined pattern masks has been selected by the first communication device. Such signalling bits don't need to be transferred each time signalling information has to be provided. The pattern mask may be selected and used for plural successive allocations of time and frequency resources.

FIG. 7 schematically represents an algorithm for determining a redrawn grid of time and frequency resources to be used for signalling time and frequency resources allocation to be used for performing said transmissions within the wireless communications network, as well as a pattern to be used for determining from signalling information time and frequency resources allocation to be used for performing said transmissions within the wireless communications network.

In a step S701, the first communication device selects a redrawn grid from amongst a set of predefined redrawn grids obtained by grouping time and frequency resources of the initial grid of time and frequency resources.

In a following step S702, the first communication device selects a pattern mask from amongst a set of predefined pattern masks.

In a following step S703, the first communication device computes a third figure of merit representative of robustness to interference for the selected pattern mask and the selected redrawn grid.

For example, when knowledge on the Signal to Interference plus Noise Ratio (SINR) is made available to the first communication device, for each time slot and frequency resource, the first communication device is able to compute a performance metric that must be maximized, such as channel capacity. Thus, by combining the selected redrawn grid and the selected pattern mask, an equivalent achievable average data rate may be computed for n transmissions thanks to the following mathematical expression:

$$\frac{1}{n}\sum_{k=0}^{n} \log_2(1 + SINR(k))$$

wherein SINR(k) is the SINR expected in the k-th time and frequency resource selected according to the selected redrawn grid and the selected pattern mask.

In a following step S704, the first communication device checks whether at least one other pattern mask from amongst the set of predefined pattern masks remains to be processed. When at least one such other pattern mask remains to be processed, the step S702 is repeated by selecting one such other pattern mask; otherwise, a step S705 is performed.

In the steps S705, the first communication device checks whether at least one other redrawn grid from amongst the set of predefined redrawn grids remains to be processed. When at least one such other redrawn grid remains to be processed, the step S701 is repeated by selecting one such other redrawn grid; otherwise, a step S706 is performed.

In the step S706, the first communication device selects the pattern mask from amongst the set of predefined pattern masks and the redrawn grid from amongst the set of predefined redrawn grids which jointly show the best third figure of merit. The selected redrawn grid is then used by the first communication device in order to perform time and frequency resources allocation and further provide the corresponding signalling information. The selected pattern mask is then used by the second communication device in order to determine the time and frequency resources of the initial grid representation to be used to perform said transmissions. Since the algorithm of FIG. 7 allows the first communication device to dynamically select the appropriate pattern mask and redrawn grid, the signalling information provided by the first communication device shall be representative of the selected pattern mask from amongst the set of predefined pattern masks as well as of the selected redrawn grid from amongst the set of predefined redrawn grids, when the second communication device has a priori knowledge of the set of predefined redrawn grids and of the set of predefined pattern masks. Such signalling bits can then be an index of the selected redrawn grid among the set of predefined redrawn grids and an index of the selected pattern mask among the set of predefined pattern masks. For instance, when the cardinality of the set of predefined pattern masks is equal to four and when the cardinality of the set of predefined redrawn grids is equal to four, four signalling bits can be used to indicate which pattern mask from amongst the set of predefined pattern masks has been selected by the first communication device and which redrawn grid from amongst the set of predefined redrawn grids has been selected by the first communication device. In a variant, such signalling bits can then be a code from amongst a codebook listing all possible combinations of one such redrawn grid and one such pattern mask. Such signalling bits don't need to be transferred each time signalling information has to be provided. The pattern mask and the redrawn grid may be selected and used for plural successive allocations of time and frequency resources.

The invention claimed is:

1. A method for determining time and frequency resources from amongst time and frequency resources of a wireless communications network to be used for performing transmissions in said wireless communications network, the transmissions being performed via time and frequency resources of the wireless communications network according to an initial grid representation of time and frequency resources that can be used for performing said transmissions, wherein time resources are divided into timeslots, wherein a first device in charge of time and frequency resources allocation performs:
  obtaining groups of time and frequency resources of the initial grid representation so as to form a redrawn grid representation;
  allocating time and frequency resources according to the redrawn grid representation and according to a frequency hopping criteria; and
  providing signalling information representative of the time and frequency resources that have been allocated according to the redrawn grid representation; and wherein, in order to determine which time and frequency resources of the initial grid representation to be used for performing said transmissions, a second device performs:
  obtaining the signalling information provided by the first device so as to determine the time and frequency resources that have been allocated according to the redrawn grid representation; and
  applying a predetermined pattern mask onto the determined time and frequency resources that have been allocated according to the redrawn grid representation, the pattern mask being such that only one time and frequency resource of the initial grid representation is effectively allocated per time slot in each allocated time and frequency resource of the redrawn grid representation.

2. The method according to claim 1, characterized in that the first device defines the groups of time and frequency resources by selecting one redrawn grid representation from amongst a first plurality of predefined redrawn grid representations, the first device indicates in the signalling information which redrawn grid representation has been selected, and the second device determines from the signalling information which redrawn grid representation has been selected.

3. The method according to claim 2, characterized in that the first device selects the redrawn grid representation by:
  computing, for each redrawn grid representation of said first plurality, a first figure of merit representative of robustness to interference for the selected redrawn grid representation; and
  selecting the redrawn grid representation of said first plurality showing the best first figure of merit.

4. The method according to claim 1, characterized in that the first device selects one pattern mask from amongst a second plurality of predefined pattern masks, the first device indicates in the signalling information which pattern mask has been selected, and the second device applies said selected pattern mask in order to determine which time and frequency resources of the initial grid representation to be used for performing said transmissions.

5. The method according to claim 4, characterized in that the first device selects the pattern mask by:
  computing, for each pattern mask of said second plurality, a second figure of merit representative of robustness to interference for said pattern mask; and
  selecting the pattern mask of said second plurality showing the best second figure of merit.

6. The method according to claim 2, characterized in that the first device selects one pattern mask from amongst a second plurality of predefined pattern masks, the first device indicates in the signalling information which pattern mask has been selected, and the second device applies said selected pattern mask in order to determine which time and frequency resources of the initial grid representation to be used for performing said transmissions and the first device selects the redrawn grid representation and the pattern mask by:
  computing, for each couple of redrawn grid representation of said first plurality and of pattern mask of said second plurality, a third figure of merit representative of robustness to interference for said couple of redrawn grid representation and of pattern mask; and
  selecting the couple of redrawn grid representation and pattern mask showing the best third figure of merit.

7. The method according to claim 4, characterized in that the pattern masks of said second plurality have a same level of orthogonality with each other.

8. The method according to claim 1, characterized in that the groups of the redrawn grid representation are formed by grouping, for each time slot of the initial grid representation, adjacent frequencies or frequency bands of the initial grid representation into frequency super-bands.

9. The method according to claim 7, characterized in that, an orthogonality factor (OF) being defined between couples of time and frequency resources sequences inside respective frequency super-bands over said v consecutive time slots, as follows:

$$OF(I1,I2)=W(f(I1;1)-f(I2;1))+W(f(I2;1)-f(I1;1))+\ldots+W(f(I1;v)-f(I2;v))+W(f(I2;v)-f(I1;v))$$

wherein I1 and I2 are time and frequency resources sequences defined by two respective pattern masks within one frequency super-band identically formed over a quantity of v consecutive time slots in each redrawn grid representation to be considered in conjunction with said pattern masks,
wherein W(f1,f2) is a measurement of co-channel interference between frequency resources f1 and f2, wherein f(I1;a) is the frequency resource of the time and frequency resources sequence I1 for a time slot a and f(I2;a) is the frequency resource of the time and frequency resources sequence I1 for the time slot a,
and in that, for ensuring that the pattern masks of said second plurality have a same level of orthogonality with each other, said pattern masks are defined such that, for any sequences Im and Ik representing respective pattern masks of said second plurality, the following relationship is met:

|OF(Im,Ik)|≤D wherein D is a predefined threshold.

10. The method according to claim 7, characterized in that, an orthogonality factor (OF) being defined between couples of time and frequency resources sequences inside plural frequency super-bands i, j over said v consecutive time slots, as follows:

OF(I'1,I'2)=max$_{i,j}$(W(fi(I'1,1)−fj(I'2,1))+W(fi(I'2,1)−fj(I'1,1)))+ ... +max$_{i,j}$(W(fi(I'1,v)−fj(I'2,v))+W(fi(I'2,v)−fj(I'1,v)))

wherein I'1 and I'2 are time and frequency resources sequences defined by two respective pattern masks within plural frequency super-bands formed over a quantity of v consecutive time slots in each redrawn grid representation to be considered in conjunction with said pattern masks,
wherein W(f1,f2) is a measurement of co-channel interference between frequency resources f1 and f2, wherein fi(I'1;a) is the frequency resource of the time and frequency resources sequence I'1 for a time slot a in the frequency super-band i, wherein fi(I'2;a) is the frequency resource of the time and frequency resources sequence I'2 for the time slot a in the frequency super-band i, wherein fj(I'1;a) is the frequency resource of the time and frequency resources sequence I'1 for the time slot a in the frequency super-band j, and wherein fj(I'2;a) is the frequency resource of the time and frequency resources sequence I'2 for the time slot a,
and in that, for ensuring that the pattern masks of said second plurality have a same level of orthogonality with each other, said pattern masks are defined such that, for any sequences I'm and I'k representing respective pattern masks of said second plurality, the following relationship is met:

|OF(I'm,I'k)|≤D wherein D is a predefined threshold.

11. The method according to claim 8, characterized in that, for each time slot of the initial grid representation, frequency or frequency bands of the initial grid representation are uniformly or quasi-uniformly distributed in terms of quantity among said frequency super-bands.

12. The method according to claim 11, wherein the initial grid representation covers frequencies from 2400 MHz to 2480 Mhz, a first frequency super-band groups frequencies from 2400 MHz to 2425 Mhz, a second frequency super-band groups frequencies from 2425 MHz to 2450 Mhz and a third frequency super-band groups frequencies from 2450 MHz to 2480 Mhz.

13. The method according to claim 8, characterized in that, the redrawn grid representation is such that groups of time and frequency resources are formed by meeting the following constraint:

$$\begin{cases} \sum_{i=1}^{n} N_i = N_t \\ \sum_{i=1}^{n} \lceil N_i \log_2(SB_i) \rceil = B_t \end{cases}$$

wherein:
⌈ ⌉ represents the ceil operator;
n represents a quantity of groups formed from the initial grid representation;
$N_i$ represents a quantity of time slots of the initial grid representation present in a group identified by an index i;
$N_t$ represents a quantity of time slots of the initial grid representation;
$SB_i$ represents a quantity of frequency super-bands for each time slots in the group identified by the index i; and
$B_t$ represents a target quantity of signalling bits available to indicate, according to the redrawn grid representation, which time and frequency resources are allocated to said transmissions.

14. The method according to claim 1, characterized in that allocations according to the redrawn grid representation are considered by sets of a predefined quantity of time slots and are associated with respective signalling words in a codebook, and the signalling information comprises the code of the codebook which is associated with the time and frequency resources that have been allocated by the first communication device according to the redrawn grid representation.

15. A system for determining time and frequency resources from amongst time and frequency resources of a wireless communications network to be used for performing transmissions in said wireless communications network, the transmissions being intended to be performed via time and frequency resources of the wireless communications network according to an initial grid representation of time and frequency resources that can be used for performing said transmissions, wherein time resources are divided into timeslots, the system comprising:
a first device in charge of time and frequency resources allocation having a processor configured to
obtain groups of time and frequency resources of the initial grid representation so as to form a redrawn grid representation;
allocate time and frequency resources according to the redrawn grid representation and according to a frequency hopping criteria; and
provide signalling information representative of the time and frequency resources that have been allocated according to the redrawn grid representation; and
a second device having a processor, in order to determine which time and frequency resources of the initial grid representation to be used for performing said transmissions, configured to
obtain the signalling information provided by the first device so as to determine the time and frequency resources that have been allocated according to the redrawn grid representation; and apply a predetermined pattern mask onto the determined time and frequency resources that have been allocated according to the redrawn grid representation, the pattern mask being such that only one time and frequency resource of the initial grid representation is effectively allocated per time slot in each allocated time and frequency resource of the redrawn grid representation.

* * * * *